US011890771B2

(12) United States Patent
Schalow et al.

(10) Patent No.: US 11,890,771 B2
(45) Date of Patent: Feb. 6, 2024

(54) BLADE REMOVAL DEVICE FOR A SLICER HAVING A HOLDING AID

(71) Applicant: Bizerba SE & Co. KG, Balingen (DE)

(72) Inventors: Steffen Schalow, Balingen (DE); Matthias Kroener, Balingen (DE); Claudius Wersching, Balingen (DE)

(73) Assignee: BIZERBA SE & CO. KG, Balingen (DE)

( * ) Notice: Subject to any disclaimer, the term of this patent is extended or adjusted under 35 U.S.C. 154(b) by 50 days.

(21) Appl. No.: 17/854,000

(22) Filed: Jun. 30, 2022

(65) Prior Publication Data

US 2023/0011013 A1 Jan. 12, 2023

(30) Foreign Application Priority Data

Jul. 8, 2021 (EP) .................................... 21184470

(51) Int. Cl.
*B26D 7/26* (2006.01)
*B26D 1/143* (2006.01)

(52) U.S. Cl.
CPC ............ *B26D 7/2621* (2013.01); *B26D 1/143* (2013.01); *B26D 2210/02* (2013.01)

(58) Field of Classification Search
CPC .......................... B26D 7/2621; B26D 2210/02
See application file for complete search history.

(56) References Cited

U.S. PATENT DOCUMENTS

| | | | | |
|---|---|---|---|---|
| 8,136,435 | B2 | 3/2012 | Zhu et al. | |
| 10,589,439 | B2 * | 3/2020 | McGuffin-Noll .... | B26D 7/2621 |
| 2015/0290828 | A1 * | 10/2015 | Weber .................. | B26D 7/2621 83/663 |
| 2017/0361428 | A1 | 12/2017 | McGuffin-Noll et al. | |
| 2020/0001489 | A1 * | 1/2020 | Snow ................... | B26D 7/2621 |
| 2023/0011013 | A1 * | 1/2023 | Schalow .............. | B26D 7/2621 |

* cited by examiner

*Primary Examiner* — Sean M Michalski
(74) *Attorney, Agent, or Firm* — LEYDIG, VOIT & MAYER, LTD.

(57) ABSTRACT

A blade removal device removes a blade of a slicer. The removal device has: a base positioned with a contact side on one side of the blade; fasteners supported in the base, rotatable from an attachment position for attaching the blade removal device to the blade into a holding position for holding the blade; and a rotary handle supported on the base and rotatable relative to the base from a closed position into an open position to release an interlock between the blade and the drive. The interlock opens when the rotary handle is in the open position and is closed when the rotary handle is in the closed position. The fasteners in the attachment position engage in cutouts of the rotary handle in the closed position. The cutouts and the fasteners are out of engagement when the rotary handle is in the open position.

16 Claims, 15 Drawing Sheets

BLADE REMOVAL DEVICE FOR A SLICER HAVING A HOLDING AID

CROSS REFERENCE TO RELATED APPLICATIONS

This application claims benefit to European Patent Application No. EP 21 184 470.9, filed on Jul. 8, 2021, which is hereby incorporated by reference herein.

FIELD

The present disclosure relates to a blade removal device for removing a circular blade of a slicer for slicing off slices from in particular a length of material to be sliced, preferably food, the blade removal device having a base which can be positioned with a contact side on one side of the circular blade.

Furthermore, the present disclosure relates to a slicing system including a slicer and a blade removal device of this kind.

BACKGROUND

Slicing systems may include a slicer and a blade removal device.

U.S. Pat. No. 8,136,435 B2 (=reference [1]) discloses a blade removal device and a tool for installation and removal of the circular blade of a slicer. Pins of the tool are inserted into through-holes of the circular blade, the pins engaging with slotted portions around the inner edge of a central opening of the circular blade in order to hold the circular blade to the tool.

However, the present inventors have recognized that, the pins used as a holder for the circular blade are relatively unstable and can therefore be easily damaged. In addition, the circular blade can relatively easily become detached from such a holder during a mounting operation, which creates a high risk of injury to operating personnel.

This is because the circular blade of a typical slicer is extremely sharp. Therefore, the removal of the circular blade from the slicer involves significant risks of injury to the user. The slicer can in principle be operated without removing the circular blade, and therefore typically is operated without removing the circular blade, since the circular blade can also be sharpened when in the mounted state. The slicer can also be cleaned with the circular blade mounted, for example by passing a cloth between the blade guard ring and the circular blade and wiping the circular blade in this way. This, however, is rather inconvenient. Moreover, more hygienic cleaning options are desired.

With the operation described above, the removal of the circular blade is limited to removal by a service technician only in the event of a repair. The service technician is usually a well-trained expert and can therefore remove the circular blade using special tools and substantially without undue danger to himself or herself.

However, as mentioned above, the present inventors have recognized that it would be desirable for the cleaning process to be improved in such a way that the circular blade can be removed for cleaning in a safe and easy manner without tools even by ordinary operating personnel; i.e., not only by a specially trained service technician. The circular blade could then also be cleaned in a commercial dishwasher, for example. Also, the cleaning of the slicer, especially with regard to the inner side of the blade guard ring, would be considerably easier with the circular blade removed.

SUMMARY

In an embodiment, the present disclosure provides a blade removal device that removes a circular blade of a slicer for slicing off slices from a length of material to be sliced. The blade removal device has: a base, which is configured to be positioned with a contact side on one side of the circular blade; fasteners rotatably supported in the base, each being configured to be rotated about an axis of rotation of the respective one of the fasteners relative to the base from an attachment position for attaching the blade removal device to the circular blade into a holding position for holding the circular blade to the blade removal device; and a rotary handle rotatably supported on the base and configured to be rotated relative to the base from a closed position into an open position to release an interlock between the circular blade and the drive of the circular blade. The interlock is configured to be open when the rotary handle is in the open position and closed when the rotary handle is in the closed position, and the fasteners in the attachment position are adapted to engage in cutouts of the rotary handle in the closed position, and the cutouts and the fasteners being out of engagement when the rotary handle is in the open position.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
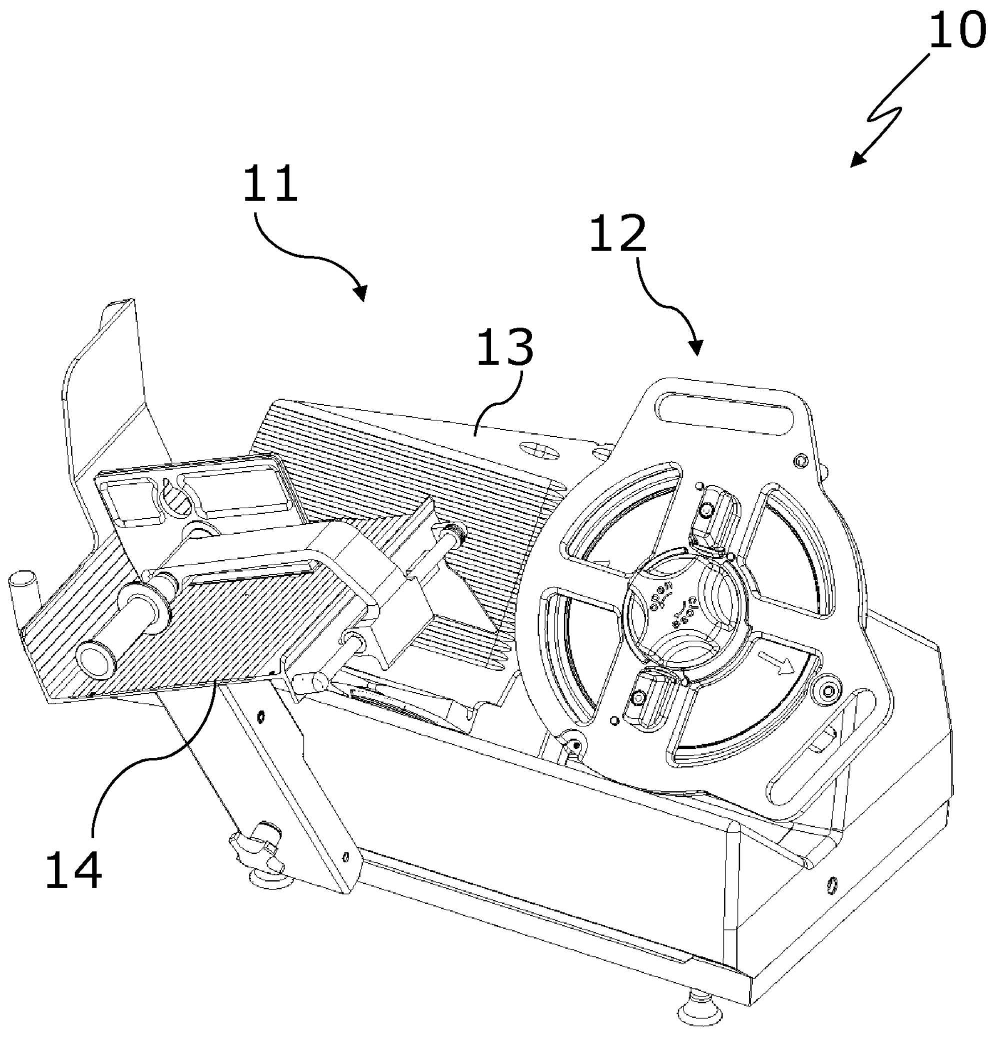
FIG. 1 is a three-dimensional view of a slicer configured as a gravity feed slicer, shown with a blade removal device.

Against this background, an aspect of the present disclosure, which is relatively challenging when considered in detail, is to provide a blade removal device of the type defined at the outset which prevents accidental release of the circular blade from the blade removal device, thereby preventing an otherwise relatively high risk of injury to operating personnel. Another aspect of the present disclosure is to provide a slicing system including a slicer as well as such a blade removal device.

An aspect of the present disclosure, in both a surprisingly simple and also effective way, provides a blade removal device that has fastening elements rotatably supported in the base, each capable of being rotated about an axis of rotation of the respective fastening element relative to the base from an attachment position for attaching the blade removal device to the circular blade into a holding position for holding the circular blade to the blade removal device, and the blade removal device has a rotary handle rotatably supported on the base and is capable of being rotated relative to the base from a closed position into an open position to release an interlock between the circular blade and the drive of the circular blade, the interlock being open when the rotary handle is in the open position and closed when the rotary handle is in the closed position, the fastening elements in the attachment position being adapted to engage in cutouts of the rotary handle in the closed position, and the cutouts and the fastening elements being out of engagement when the rotary handle is in the open position.

Thus, the present disclosure provides a blade removal device which not only holds the circular blade, but also holds the circular blade after its removal in such a way that its cutting edge cannot be touched. Furthermore, the blade removal device according to an aspect of the present disclosure includes means for preventing the circular blade from being separated from the blade removal device when the blade is not installed in the slicer.

This eliminates the heretofore always present risk of accidental release of the circular blade from the blade removal device:

When the blade removal device is applied to the circular blade, the fastening elements are in the attachment position, locking the rotary handle in the closed position. The fastening elements can engage in the cutouts of the rotary handle only when in the attachment position. For this purpose, the rotary handle itself is in the closed position.

After sliding the blade removal device onto the circular blade, the fastening elements are rotated into the holding position to hold the circular blade to the blade removal device. For this purpose, the holding elements are brought out of engagement with the cutouts of the rotary handle. Thus, it is only after the fastening elements have been rotated out of the attachment position and, thus, after the circular blade has been secured to the blade removal device that the rotary handle can be rotated from the closed position into the open position.

As this occurs, the interlock between the circular blade and the drive, which may be configured in particular as a bayonet interlock, is released.

Preferably, the interlock, especially when designed in a bayonet-like manner, includes an interlock member forming part of the drive and having bulges, and an element releasably or permanently connected to the circular blade, for example a nut, the element having protrusions and recesses between these protrusions. The protrusions of the element are adapted to engage behind the bulges of the drive in the direction of the axis of rotation of the circular blade when the interlock is in the closed position in order to hold the circular blade to the drive. The element has recesses between the protrusions to allow insertion of the bulges when the element is slid onto the drive in order to move the protrusions of the element in the direction of the axis of rotation of the circular blade and past the bulges of the drive, and to then position the protrusions by a rotational movement in such a way that they are engage behind the bulges.

To remove the circular blade from the drive, the rotational movement and the displacement movement of the element having the protrusions can be performed in reverse order and direction. Thus, the circular blade is releasably attached to the drive. In the open position of the rotary handle, the cutouts of the rotary handle are spaced apart from the fastening elements. Therefore, the fastening elements cannot be brought into engagement with the cutouts, and are thereby reliably prevented from returning to the attachment position. In this way, the circular blade is securely held to the blade removal device after it has been released from the drive.

A particularly preferred class of embodiments of the blade removal device according to the present disclosure is characterized in that the fastening elements each have a blade holder to be passed through associated through-holes of the circular blade in the attachment position and to hold the circular blade in the holding position, and further each have a blade holder lever for rotating the blade holder, the blade holder having a retaining pin oriented parallel to the base, the blade holder lever being adapted to engage in one of the cutouts of the rotary handle in the closed position when the respective fastening element is in the attachment position, and the blade holder lever being oriented perpendicular to the retaining pin and parallel to the base, and the blade holder lever preferably being disposed on the side of the base opposite the blade holder.

The blade holders are passed through the associated through-holes of the circular blade when the blade removal device is slid onto the circular blade. In this process, the blade holder levers engage in the cutouts of the rotary handle in the closed position. In the attachment position, the blade holder levers lock the rotary handle in the closed position so that the rotary handle cannot be rotated into the open position as long as the blade holder levers are in the attachment position.

After the blade removal device is applied to the circular blade, the levers are rotated out of the cutouts. As a result, the circular blade is secured to the base by the blade holders. The rotary handle is then rotated from its closed position into the open position. In this process, the interlock between the circular blade and its drive is released, thereby allowing the circular blade to be removed from the drive. In the open position of the rotary handle, the cutouts of the rotary handle are spaced apart from the blade holder levers. The blade holder levers can no longer engage in the rotary handle, so that they can no longer be rotated back into the attachment position. In particular, when attempting to rotate them back into the attachment position, they bear against the rotary handle between the cutouts in the circumferential direction of the rotary handle. Consequently, the blade holders connected to the blade holder levers can no longer be passed through the associated through-holes of the circular blade. The blade holders hold the circular blade to the blade removal device, and the circular blade cannot be released from the blade removal device while the rotary handle is in the open position.

In the attached state of the blade removal device, the attachment position corresponds in particular to a vertical orientation of the blade holder levers, while the holding position corresponds to a horizontal orientation of the blade holder levers.

A refinement of the aforementioned class of embodiments is characterized in that the base is configured with stops for the blade holder levers. The stops limit the rotation of the blade holder levers to a desired angular range, in particular to 90°.

A preferred embodiment of the blade removal device is characterized in that the fastening elements have springs for pressing the circular blade against the base, the springs in particular being disposed on the side of the base opposite the contact side. This embodiment further reduces the risk of injury by accidental contact with the circular blade, which is only slightly spaced from the blade removal device.

Another advantageous embodiment of the blade removal device according to the present disclosure is characterized in that the rotary handle is configured for rotating a hexagon, the hexagon being formed on a nut that is part of the interlock. By rotating the hexagon, the interlock can be easily released.

In other preferred embodiments of the blade removal device, the rotary handle can be transferred from the closed position into the open position by rotation through about 60°, the rotary handle in particular extending through a central opening of the base. In particular, the aforementioned hexagon has rotational symmetry when rotated through 60°. Because the rotary handle extends through the base, a user can grab the rotary handle on one side of the blade removal device and apply it to the interlock on the other side thereof, and is thereby able to manipulate the blade removal device with ease.

One class of advantageous embodiments of the present disclosure is characterized in that a retaining plate having lugs is disposed in the rotary handle, and in that the base has lug receptacles for receiving the lugs in the open position and/or the closed position of the rotary handle, the rotary handle having at least one spring element, preferably four spring elements, for exerting a spring force on the retaining plate in the direction of the base, the spring force pushing the lugs into the lug receptacles, and the base preferably having guide grooves for connecting the lug receptacles in pairs.

Via the retaining plate, the lugs in the lug receptacles prevent rotation of the rotary handle, provided the retaining plate is not moved against the spring force of the spring elements. The rotary handle is thus mechanically secured in its position.

For each nose, there is preferably one lug receptacle into which the lug is inserted in the closed position of the rotary handle, and one lug receptacle into which the lug is inserted in the open position of the rotary handle. When the lugs are inserted in their associated lug receptacles, the retaining plate of the rotary handle secures the rotary handle in its closed position or in its open position, respectively. Securing the rotary handle in its open position prevents the rotary handle from being rotated back into an open position after the blade removal device has been removed from a slicer along with the circular blade. This prevents the possibility of the blade holder lever being brought into the attachment position, thereby preventing the circular blade from being accidentally released from the blade removal device. During rotation of the rotary handle, the respective lug is moved between these two lug receptacles, in particular in a guide groove. Preferred are embodiments of the retaining plate which have two lugs.

Preferred refinements of this class of embodiments are characterized in that the retaining plate has a retaining pin for moving the retaining plate away from the base against the spring force of the at least one spring element, the retaining pin preferably being centrally disposed in the rotary handle in a guide tube. By applying a force to the retaining pin in the direction of the retaining plate, the retaining plate is moved away from the base, thereby removing the lugs from the lug receptacles. As a result, the retaining plate, and thus the remainder of the rotary handle connected to the retaining plate, is no longer fixed in its position and can be rotated. The application of force to the retaining pin occurs in particular when the blade removal device is slid onto the circular blade by the circular blade, preferably by a release pin formed on the drive, which presses against the retaining pin when the blade removal device is slid into place.

Another advantageous embodiment of the present disclosure is one in which the blade removal device is configured with a latch for fixation to the blade guard ring and/or with receptacles for receiving pins of the blade guard ring. The latch and the receptacles for the pins allow the blade removal device to be attached to the blade guard ring after it is slid onto the circular blade in order for it to be stably held to the circular blade when the interlock between the circular blade and the drive is released.

The scope of the present disclosure also includes a slicing system including a slicer for slicing off slices from in particular a length of material to be sliced, preferably food, the slicer including a drive for holding and driving a circular blade, the drive and the circular blade being connected together by an interlock, the slicing system including a blade removal device for removing the circular blade, and the blade removal device having a base which can be positioned with a contact side on one side of the circular blade. In accordance with the present disclosure, this is characterized in that the blade removal device has fastening elements rotatably supported in the base, each capable of being rotated about an axis of rotation of the respective fastening element relative to the base from an attachment position for attaching the blade removal device to the circular blade into a holding position for holding the blade removal device to the circular blade, and in that the blade removal device has a rotary handle rotatably supported on the base and capable of being rotated relative to the base from a closed position into an open position to release the interlock between the circular blade and the drive of the circular blade, the interlock being open when the rotary handle is in the open position and closed when the rotary handle is in the closed position, the fastening elements in the attachment position being adapted to engage in cutouts of the rotary handle in the closed position, and the cutouts of the rotary handle and the fastening elements being out of engagement when the rotary handle is in the open position.

In such a slicing system, the circular blade is prevented from accidentally releasing from the blade removal device after it has been removed from its drive. The fastening elements in the attachment position secure the rotary handle in the closed position. After attachment, the fastening elements are rotated out of the cutouts and thereby transferred into the holding position in which they hold the circular blade to the blade removal device. The rotary handle is rotated into the open position, releasing the interlock. The cutouts, when rotated away from the closed position of the rotary handle, are spaced apart from the fastening elements, so that the fastening elements can no longer engage in the cutouts. Consequently, they can also no longer return to the attachment position. In this way, the blade is securely held to the blade removal device.

The "contact side" refers in particular to the side of the blade removal device that faces the circular blade when the blade removal device is slid into place. In particular, it can be positioned on the side of the circular blade at a distance defined by the rotary handle.

A first embodiment of the slicing system is characterized in that the circular blade has through-holes for passage therethrough of associated blade holders of the fastening elements in the attachment position of the fastening elements and for locking the blade holders in the holding position of the fastening elements.

In the attachment position of the fastening elements, the blade holders are oriented parallel to the through-holes to allow passage of the blade holders through the through-holes. In the holding position of the fastening elements, the blade holders are oriented perpendicularly or obliquely with respect to the through-holes. The through-holes can no longer be guided along the blade holders, so that the blade holders block movement of the circular blade away from the blade removal device.

Another embodiment of the slicing system according to the present disclosure is characterized in that a nut is releasably attached to the circular blade about the axis of rotation thereof, the nut being part of the interlock and being configured with recesses for forming the interlock with associated bulges of the drive of the circular blade, the nut preferably having a hexagon formed thereon for rotating the nut, and the rotary handle in particular being configured for rotating the hexagon.

By applying the rotary handle to the hexagon and subsequently rotating the rotary handle and thus also the hexagon, the nut is also rotated, whereby the interlock can be released in a simple and stable manner. In particular, the interlock is released in such a way that the recesses of the nut are each positioned behind one of the bulges of the drive in the direction of the rotary axis of the circular blade. Then, in order to remove the circular blade from the drive, the nut can be pulled along the recesses over the drive with the bulges.

In another advantageous embodiment of the slicing system, the circular blade has an arrow that points to a pin on the blade guard ring when the circular blade is in an angular position in which the through-holes are located at the top and bottom. Due to the previously known angular position of the circular blade and the therefore also known exact position of the through-holes, the blade removal device can be relatively easily attached to the circular blade.

Another preferred embodiment of the slicing system according to the present disclosure is characterized in that the drive of the circular blade has a release pin for releasing the retaining pin, the release pin resting against the retaining pin of the retaining plate and in particular being disposed on the axis of rotation of the circular blade. When the release pin and the retaining pin are positioned on the axis of rotation of the circular blade, the displacement of the retaining plate is effected in particular with a symmetrical distribution of forces, so that the retaining plate is displaced in a uniform manner.

In advantageous embodiments of the slicing system according to the present disclosure, the slicer is configured as a gravity feed slicer or as a vertical slicer. In both types of slicers, the circular blade can be removed using the blade removal device according to the present disclosure.

Further advantages of the present disclosure will become apparent from the description and the drawings. According to the present disclosure, the features mentioned above and those yet to be further described may be used alone or in any combination. The embodiments shown and described should not be construed as being an exhaustive listing, but rather as characteristic examples to illustrate the present disclosure.

The present disclosure relates to a blade removal device for removing a circular blade of a slicer for slicing off slices from in particular a length of material to be sliced.

Figure 2A:
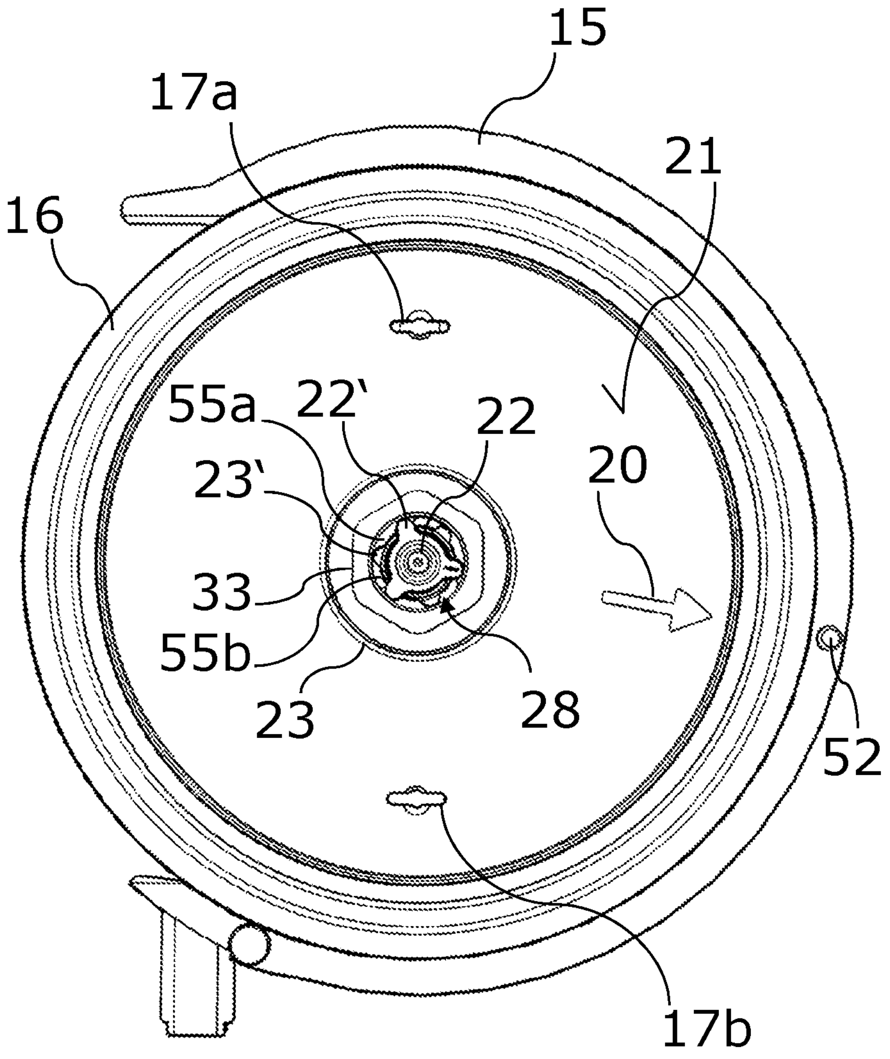
FIG. 2*a* is an elevational view of a circular blade which is surrounded by a blade guard ring of the slicer and coupled to a drive, looking at the side opposite the drive.
Figure 2B:
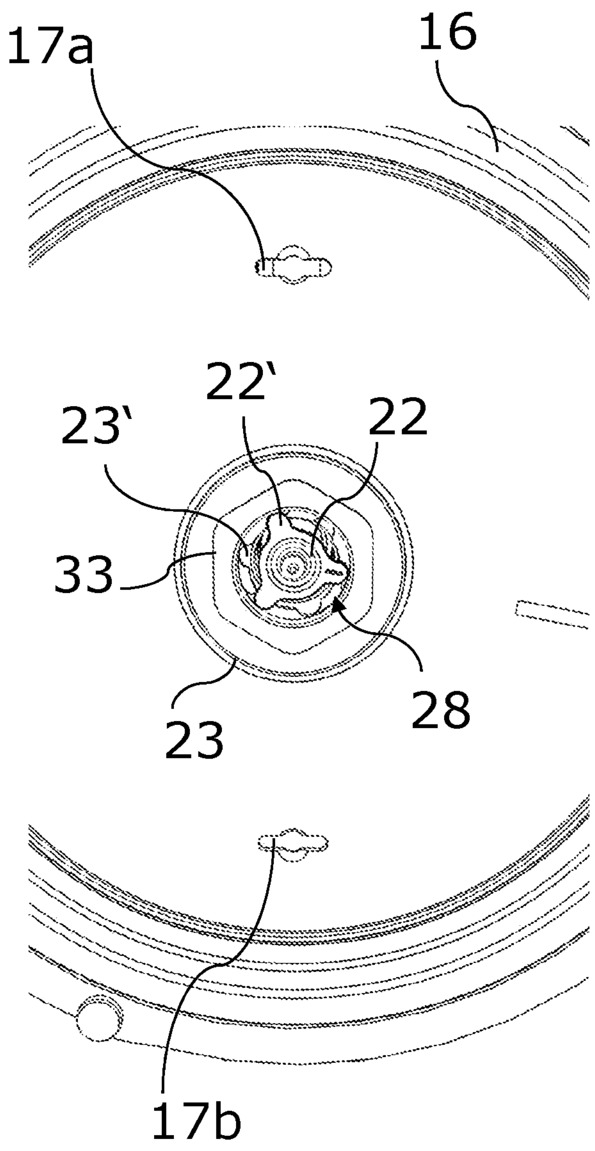
FIG. 2*b* is a detail view of the coupled circular blade.
Figure 3A:
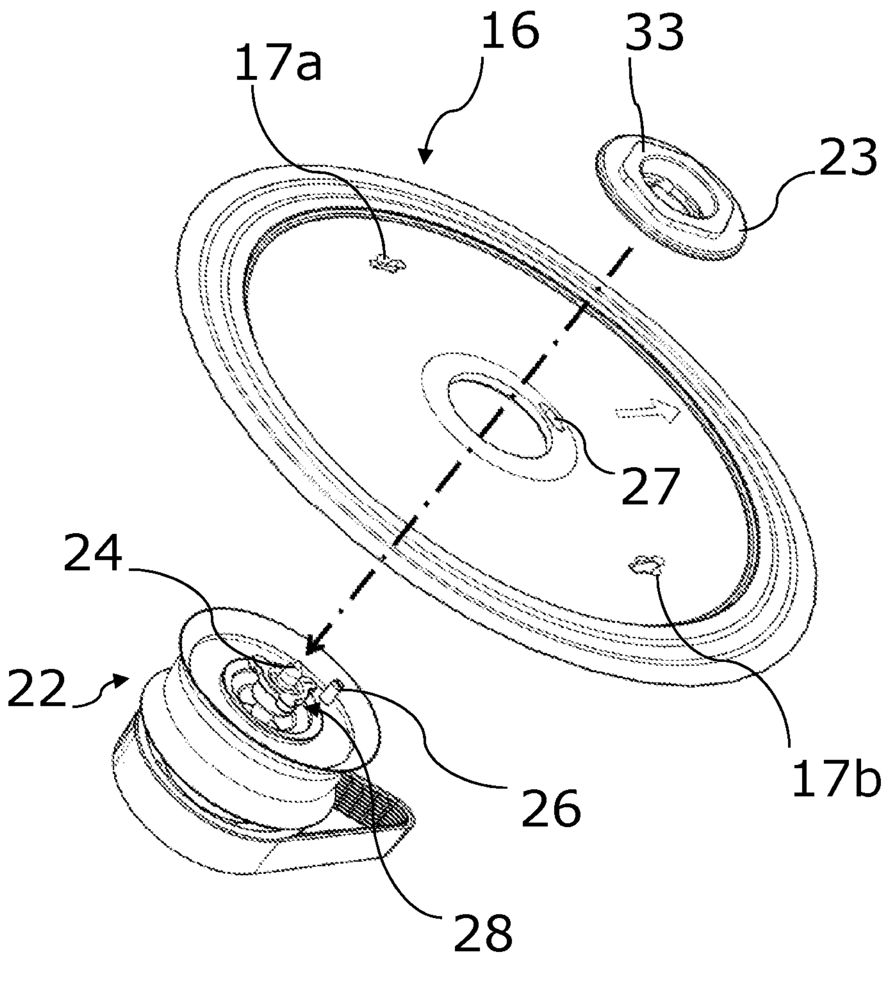
FIG. 3*a* is an exploded view showing the circular blade and its drive as well as a nut for connecting the circular blade to the drive.
Figure 3B:
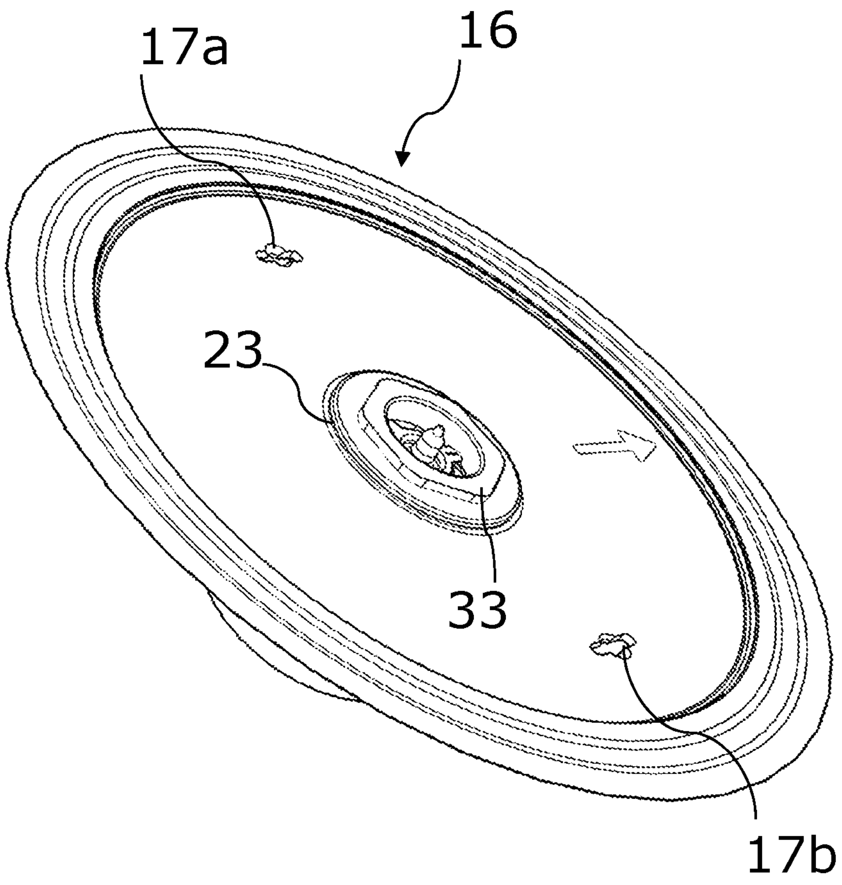
FIG. 3*b* is a three-dimensional view showing the circular blade connected to the drive via the nut.
Figure 3C:
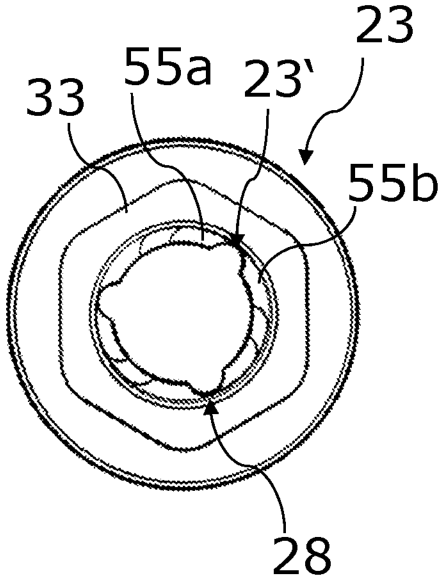
FIG. 3*c* is a plan view of the nut.

FIG. 1 shows an isometric view of an embodiment of the inventive slicing system including a blade removal device according to an aspect of the present disclosure. FIGS. 2*a* and 2*b* show a coupled circular blade surrounded by a blade guard ring. An interlock for attaching a circular blade to a drive is shown in FIGS. 3*a* through 3*c*. FIGS. 4 and 5*a* through 5*e* show different views of a blade removal device according to the present disclosure. FIGS. 6*a* through 6*c* illustrate a retaining plate for fixation to a base of the blade removal device according to the present disclosure.

In FIG. 1, there is shown a slicing system 10 including a slicer 11 configured as a gravity feed slicer and an inventive blade removal device 12 for removing a circular blade (see FIG. 2*a*). Slicer 11 includes a stop plate 13 and a movably disposed carriage 14, by means of which material to be sliced, generally a length of material to be sliced, is fed to the circular blade.

FIG. 2*a* shows, in side view, the circular blade 16 partially surrounded by a blade guard ring 15. Circular blade 16 has through-holes 17*a*, 17*b* allowing passage therethrough of blade holders 18*a*, 18*b* of fastening elements 19*a*, 19*b* (shown in FIG. 4). In the view shown in FIG. 2*a*, where through-holes 17*a*, 17*b* are located at the top and bottom on a vertical axis through the center of rotation of circular blade 16, an arrow 20 on a side 21 of circular blade 16 points to a pin 52 on blade guard ring 15. To allow passage through the through-holes 17*a*, 17*b*, fastening elements 19*a*, 19*b* are located in an attachment position in which blade holders 18*a*, 18*b* are oriented parallel to through-holes 17*a*, 17*b*.

A drive 22 supports circular blade 16 via a nut 23 disposed in circular blade 16. Nut 23 is disposed about the axis of rotation of circular blade 16. Recesses 23' between protrusions 55*a*, 55*b* on the inner edge of nut 23 are used to form an interlock 28, in particular a bayonet-type interlock, with associated bulges 22' of the drive 22 of circular blade 16. Interlock 28 includes in particular the bulges 22' of drive 22 and the protrusions 55*a*, 55*b* of nut 23, the protrusions 55*a*, 55*b* of nut 23 being adapted to engage behind the bulges 54*a*, 54*b* of drive 22 in the direction of the axis of rotation of circular blade 16 when interlock 28 is in the closed position in order to hold circular blade 22 to drive 22.

Recesses 23' are used for insertion of bulges 22' when nut 23 is slid onto drive 22 in order to move protrusions 55*a*, 55*b* of nut 23 in the direction of the axis of rotation of circular blade 16 and past the bulges 22' of drive 22, and to then position protrusions 55*a*, 55*b* by a rotational movement in such a way that they engage behind bulges 22'. Thus, protrusions 55*a*, 55*b*, together with bulges 22', prevent circular blade 16 from being displaced in the direction of the axis of rotation of circular blade 16. The sliding into place of nut 23 under axial displacement of protrusions 55*a*, 55*b* occurs in particular while a rotary handle 32 (see FIG. 4) of blade removal device 12 is in an open position, and the positioning of protrusions 55*a*, 55*b* of nut 23 for engagement behind bulges 22' of drive 22 occurs while rotary handle 32 is in a closed position. Nut 23 is formed with a hexagon 33 for rotating nut 23.

FIG. 2*b* shows an enlarged detail of circular blade 16 with the nut 23 attached to drive 22 and with the blade holders 18*a*, 18*b* disposed in through-holes 17*a*, 17*b*.

Figure 5A:
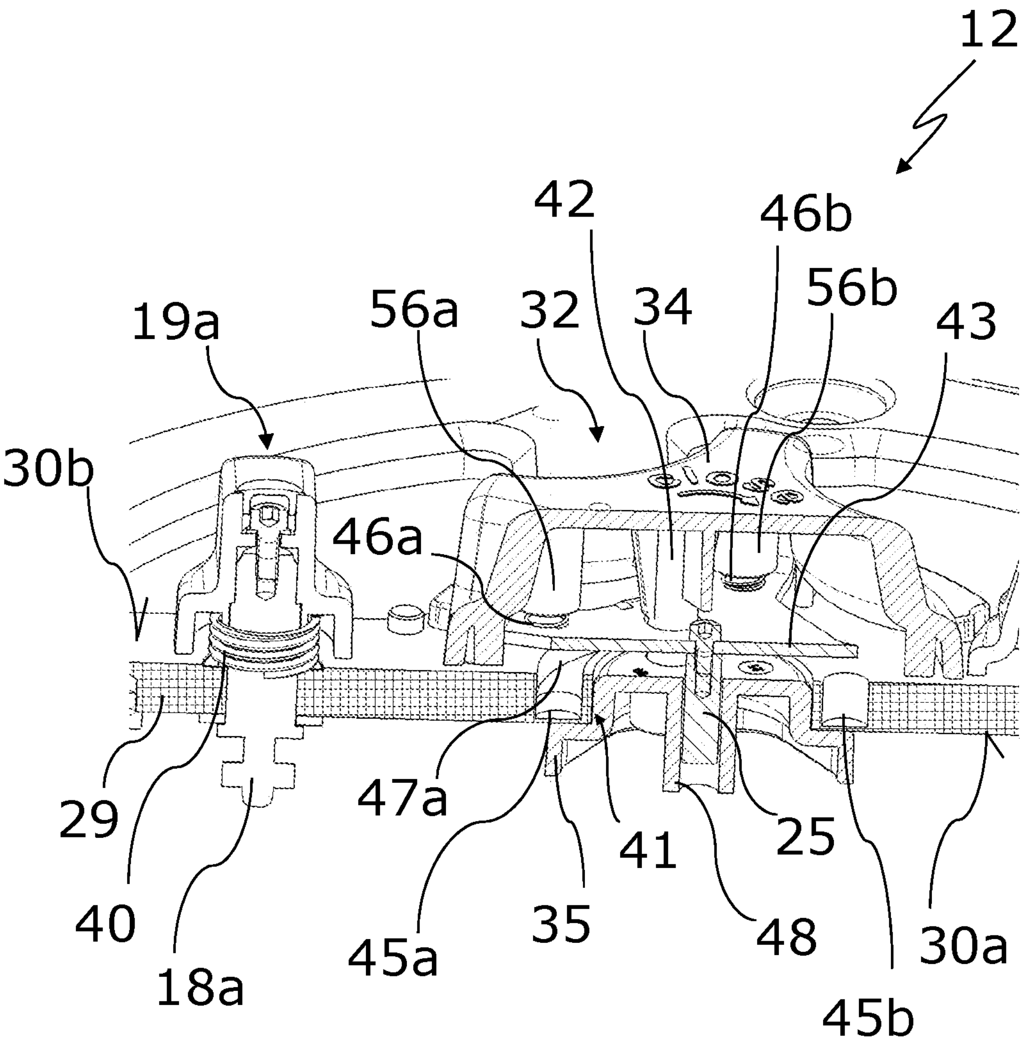
FIG. 5*a* is a first sectional view through the blade removal device.
Figure 6A:
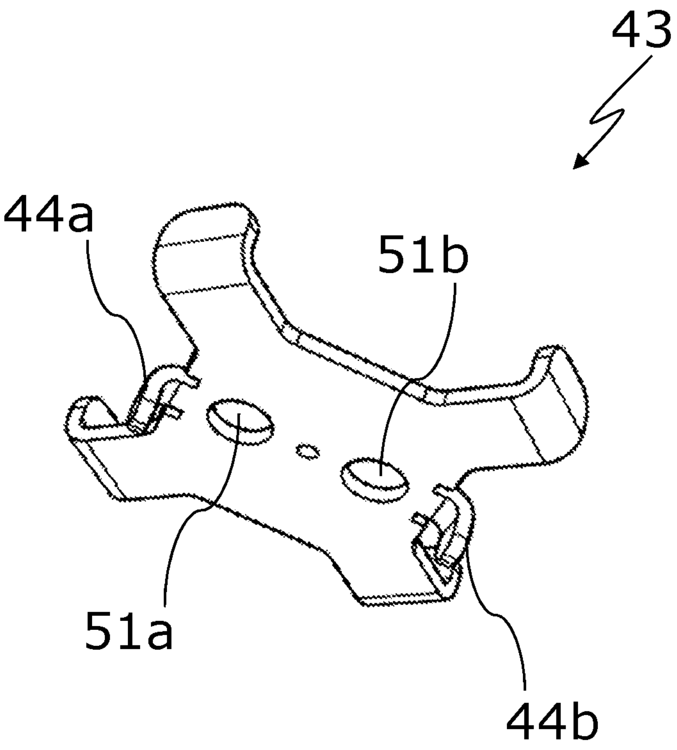
FIG. 6*a* is a three-dimensional view of a retaining plate of the blade removal device.
Figure 6B:
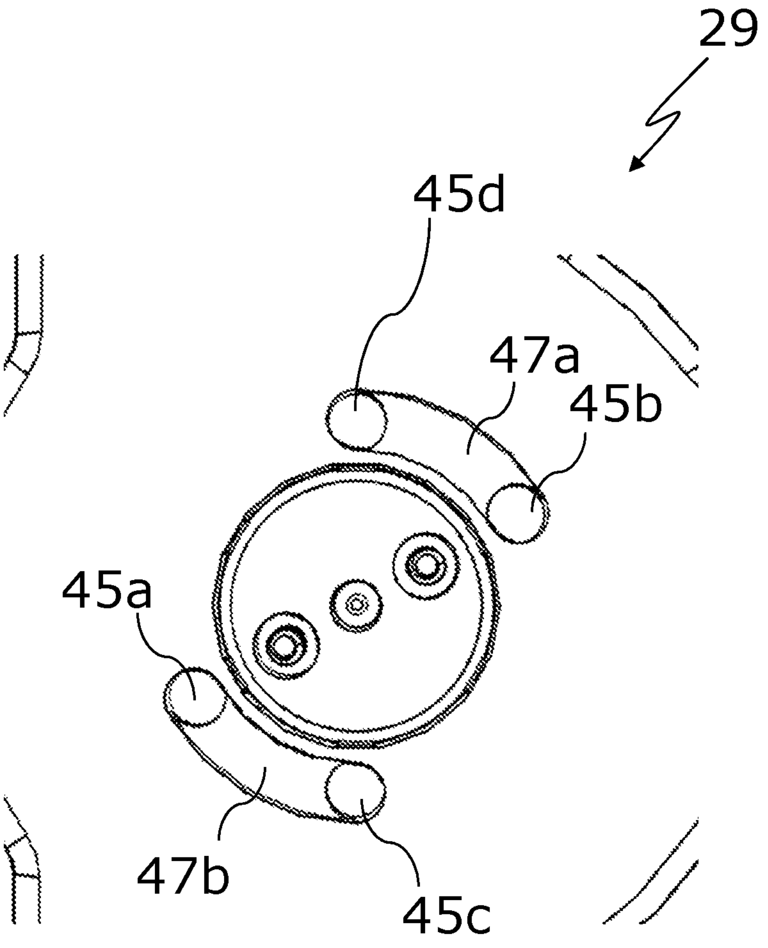
FIG. 6*b* is a view of a portion of a base of the blade removal device.
Figure 6C:
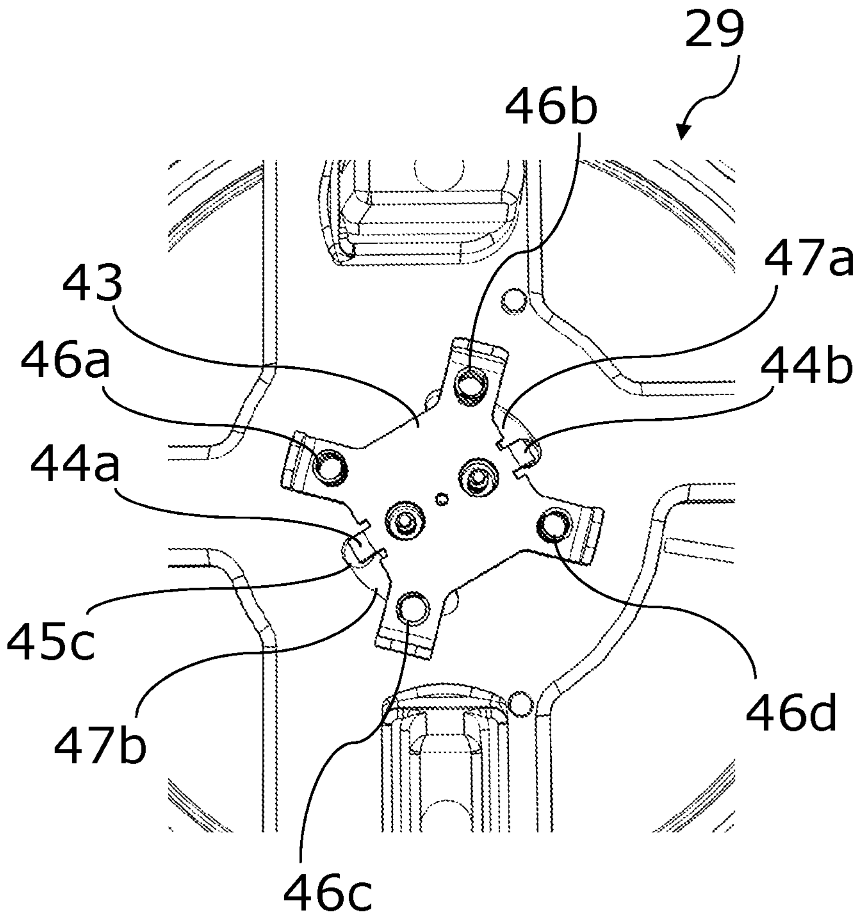
FIG. 6c is a plan view of the retaining plate disposed on the base.

A release pin 24 of drive 22, shown in FIG. 3*a*, is used to displace a retaining pin 25 of blade removal device 12 (see FIG. 5*a*). Release pin 24 is disposed on the axis of rotation of circular blade 16 with the through-holes 17*a*, 17*b*. A drive pin 26 of drive 22 is inserted into a drive pin through-hole 27 of circular blade 16 so as to rotate circular blade 16. During this, drive 22 and circular blade 16 are fixedly connected together by bayonet-type interlock 28, which includes the bulges 22' of drive 22 and the recesses 23' of the nut 23 inserted in circular blade 16. Also shown is the hexagon 33 formed on nut 23 for rotating nut 23.

The circular blade 16 attached to drive 22 via nut 23 is shown in FIG. 3*b*.

A detail view of the nut 23, including the protrusions 55*a*, 55*b* and the recesses 23' for forming the interlock 28 with drive 22, is shown in FIG. 3*c*.

Figure 4:
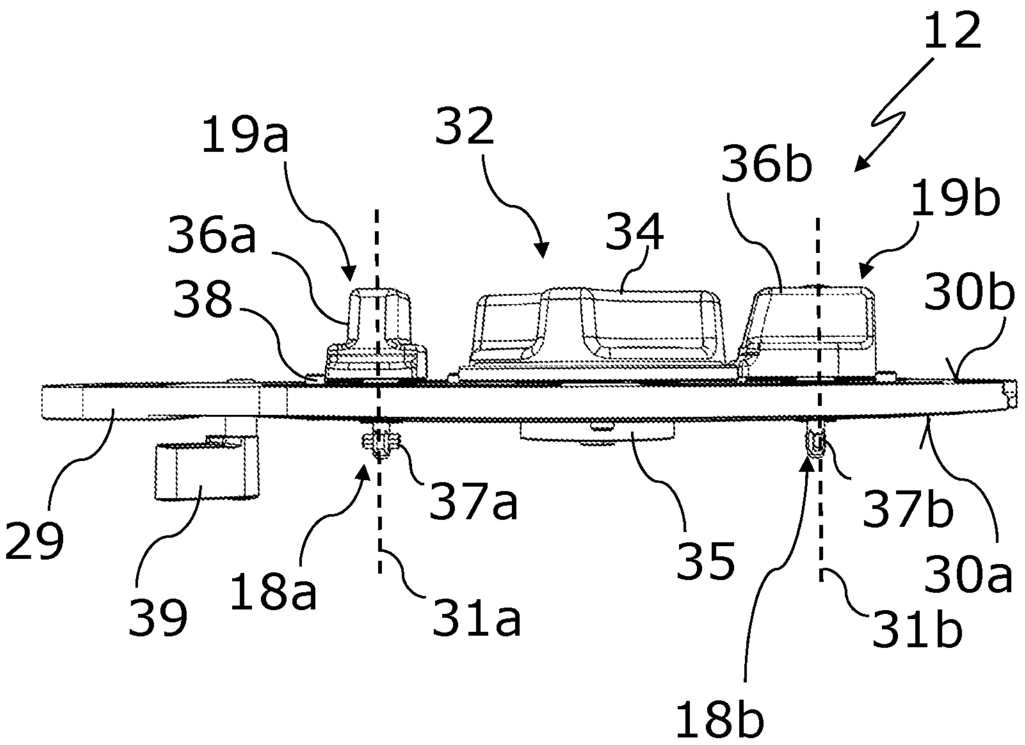
FIG. 4 is a side view of an embodiment of the inventive blade removal device for removing the circular blade from the slicer.

The blade removal device 12 for removing circular blade 16 from slicer 11 has a base 29, which is shown in FIG. 4. Base 29 has a contact side 30*a* to be disposed on the side 21 of circular blade 16, which is shown in FIG. 2*a*. Fastening elements 19*a* and 19*b* are rotatably supported in base 29. Fastening elements 19*a*, 19*b* are each capable of being rotated about an axis of rotation 31*a*, 31*b* of the respective fastening element 19*a*, 19*b* relative to base 29 from the attachment position for attaching blade removal device 12 to circular blade 16 into the holding position for holding circular blade 16 to blade removal device 12.

A rotary handle 32 for rotating hexagon 33 (see FIG. 3*a*) is centrally disposed on base 29. Rotary handle 32 has a gripping portion 34 for gripping and rotation of rotary handle 32 by a user and an engagement portion 35 for engagement on hexagon 33 (see FIG. 3*a*) and rotation thereof. Gripping portion 34 and engagement portion 35 are each disposed on one of the opposite sides 30*a*, 30*b* of base 29.

Fastening elements 19*a*, 19*b* include blade holders 18*a*, 18*b* (see FIG. 2*a*) as well as blade holder levers 36*a*, 36*b* by which a user can rotate blade holders 18*a*, 18*b*. Blade holder levers 36*a*, 36*b* are adapted to engage in rotary handle 32 in the closed position when the associated fastening elements 19*a*, 19*b* are in the attachment position, as shown here by way of example by fastening element 19*b*.

Blade holders 18*a*, 18*b* are each configured with a retaining pin 37*a*, 37*b* oriented parallel to base 29. Blade holder levers 36*a*, 36*b* are oriented perpendicular to retaining pins 37*a*, 37*b*. To enable blade holders 18*a*, 18*b* to be operated when blade removal device 12 is slid onto circular blade 16, blade holder levers 36*a*, 36*b* are disposed on the side 30*b* of base 29 that is opposite to blade holders 18*a*, 18*b*. Base 29 has stops for blade holder levers 36*a*, 36*b*, the stops limiting the angular range of rotation of blade holder levers 36*a*, 36*b*. By way of example, one stop is denoted by reference numeral 38 in the figure. A rotatable latch 39 on base 29 is used to fix blade removal device 12 to blade guard ring 15.

Fastening elements 19*a*, 19*b* have springs 40, shown exemplarily on fastening element 19*a* in FIG. 5*a*, by means of which circular blade 16 is pressed against base 29 via blade holders 18*a*, 18*b*. Springs 40 are disposed on the side 30*b* of base 29 which is opposite the contact side 30*a*. Springs 40 push fastening elements 19*a*, 19*b* away from this side 30*b* of the base so that the blade holders 18*a*, 18*b* rigidly connected to fastening elements 19*a*, 19*b* are pulled by the spring force in the direction of contact side 30*a*. Rotary handle 32 extends through a central opening 41 of base 29, with gripping portion 34 and engagement portion 35 being connected together by connecting rods 42. A user can apply rotary handle 32, and more specifically engagement portion 35, to hexagon 33 of nut 23 on the side 30*a* facing circular blade 16 (see FIG. 3*a*) and can rotate rotary handle 32, and more specifically gripping portion 34, on the side 30*b* facing away from circular blade 16, and thereby rotate nut 23.

Located in rotary handle 32 is a retaining plate 43 having two lugs 44*a*, 44*b* (see FIG. 6*a*). Base 29 has lug receptacles 45*a*, 45*b* for receiving lugs 44*a*, 44*b* in the open position and/or the closed position of rotary handle 32.

Spring elements 46*a*, 46*b* of rotary handle 32, which are guided by spring holders 56*a*, 56*b*, exert a spring force on retaining plate 43 in the direction of base 29. Lugs 44*a*, 44*b* are thereby forced into lug receptacles 45*a*, 45*b* so as to fix retaining plate 43 and, thus rotary handle 32 in their respective positions. Under the application of a force to retaining pin 25 along its longitudinal axis in the direction of retaining plate 43, retaining plate 43 is moved away from base 29 against the force of spring elements 46*a*, 46*b*, thereby removing lugs 44*a*, 44*b* from lug receptacles 45*a*, 45*b*. As a result, retaining plate 43, and thus the remainder of rotary handle 32 connected to retaining plate 43, is unlocked and can be rotated. The application of force a to retaining pin 25 occurs in particular only when blade removal device 12 is slid onto circular blade 16 by the release pin 24 formed on drive 22, which is pressed against retaining pin 25 as blade removal device 12 is slid into place. Release pin 24 is permanently formed on slicer 11 as part of drive 22.

Guide grooves 47*a*, 47*b* (see FIG. 5*b*) for guiding lugs 44*a*, 44*b* connect lug receptacles 45*a*, 45*b* in pairs. Retaining pin 25 is used to move retaining plate 43 away from base 29 against the spring force of spring elements 46*a*, 46*b* under the action of release pin 24 of drive 22 (see FIG. 3*a*). Retaining pin 25 is centrally disposed in rotary handle 32 in a guide tube 48.

Figure 5B:
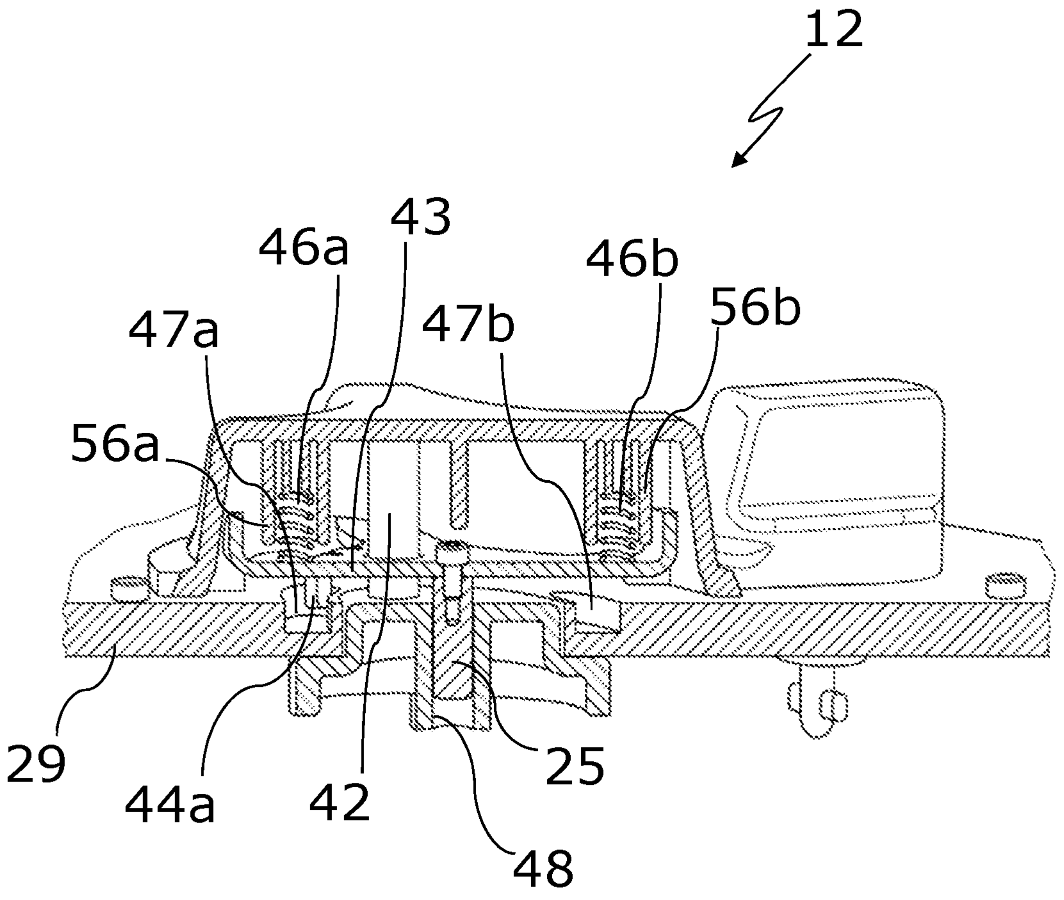
FIG. 5*b* is a second sectional view through the blade removal device.

FIG. 5*b* illustrates the blade removal device 12, showing lug 44*a* on retaining plate 43 and guide grooves 47*a*, 47*b* in base 29 as well as spring elements 46*a*, 46*b*. Also shown is retaining pin 25 in guide tube 48.

Figure 5C:
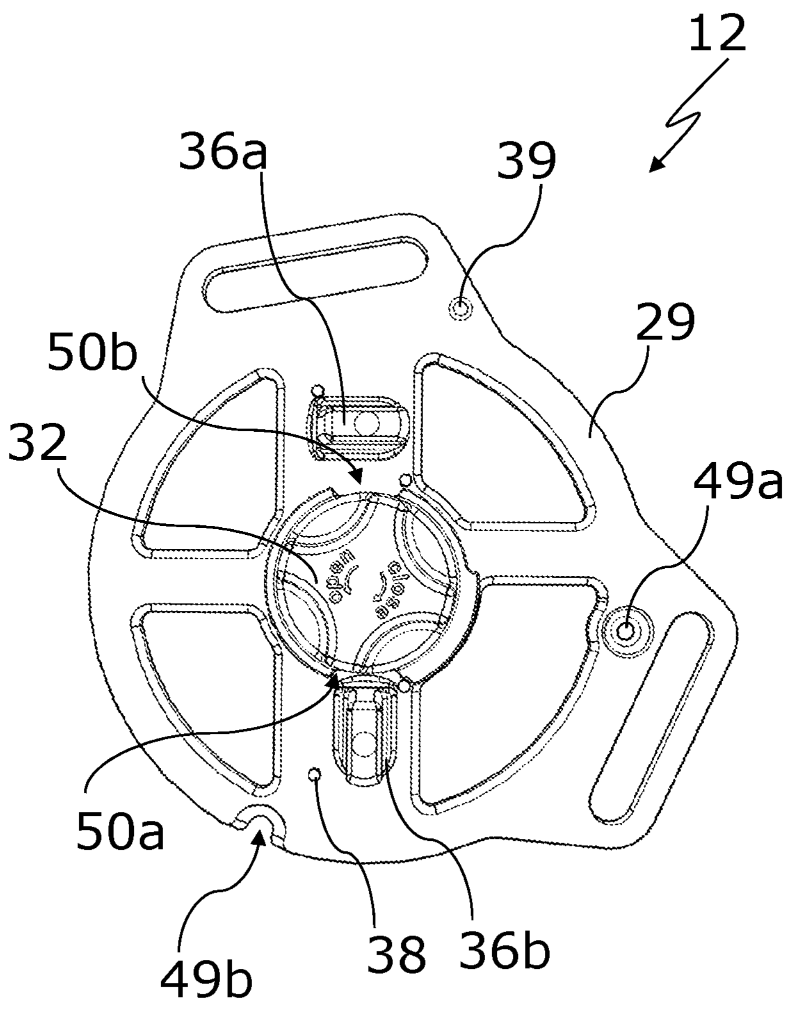
FIG. 5*c* is a plan view of the blade removal device.

As illustrated in FIG. 5*c*, base 29 has receptacles 49*a*, 49*b* for receiving pins of blade guard ring 15. Also shown in FIG. 5*c* are the stops for blade holder levers 36*a*, 36*b*, one of which is denoted by 38 by way of example, and cutouts 50*a*, 50*b* of rotary handle 32 for receiving blade holder levers 36*a*, 36*b* in the attachment position when rotary handle 32 is in the closed position.

Figure 5D:
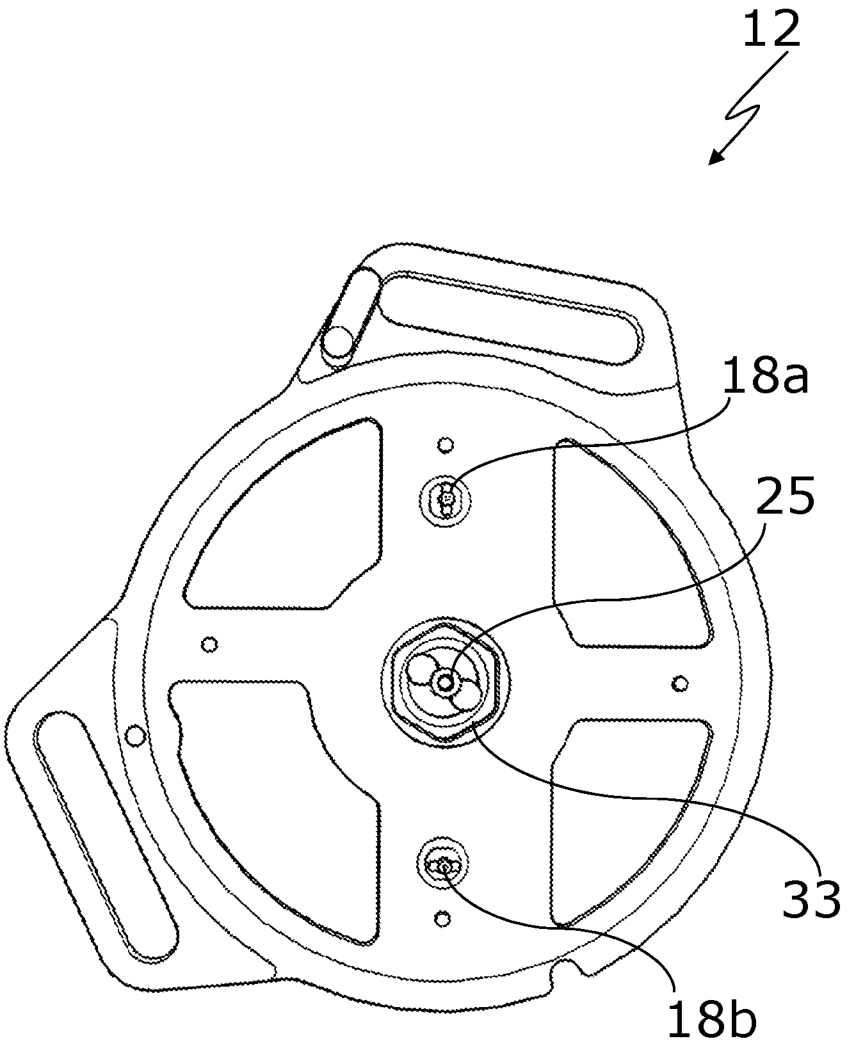
FIG. 5*d* is an elevational view looking at the side of the blade removal device facing the circular blade.
Figure 5E:
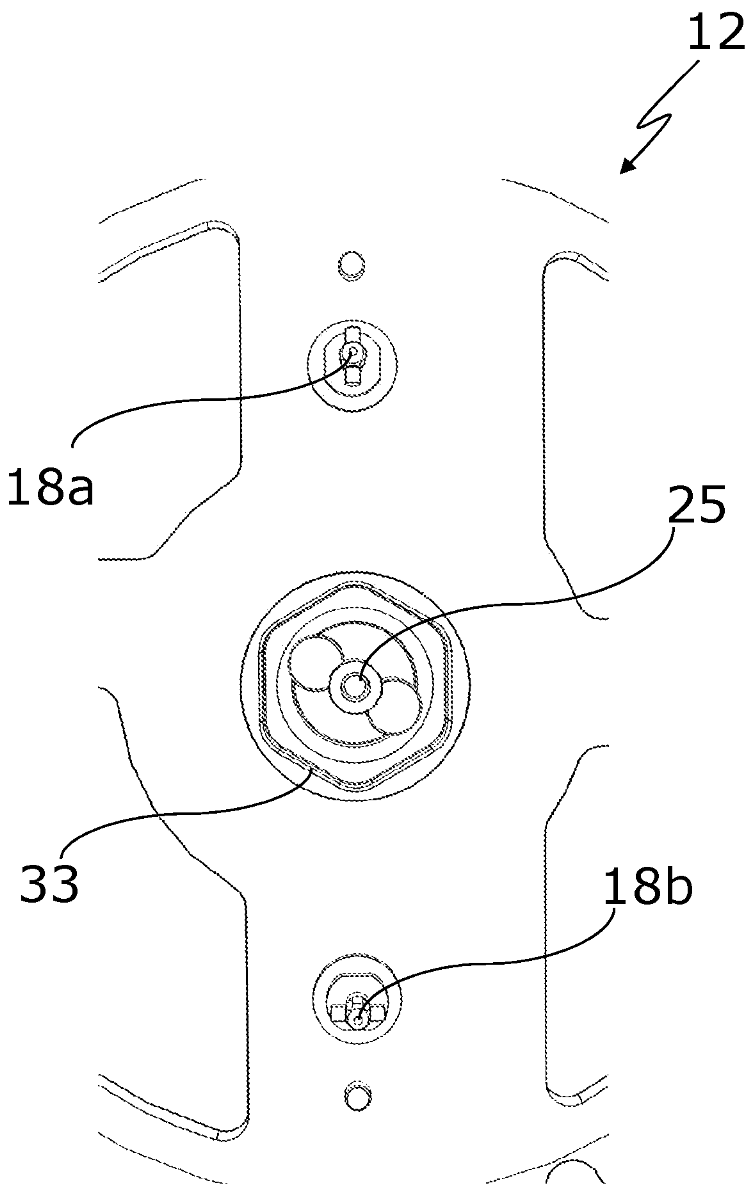
FIG. 5*e* is a detail of the elevational view looking at the side of the blade removal device facing the circular blade.

In FIG. 5*d* and FIG. 5*e*, blades holders 18*a*, 18*b*, which can be rotated via blade holder levers 36*a*, 36*b*, are shown along with hexagon 33 and retaining pin 25 in a plan view of blade removal device 12.

Lugs 44*a*, 44*b* are formed at opposite sides of retaining plate 43, as shown in FIG. 6*a*. Also shown here are retaining plate openings 51*a*, 51*b* through which extend the connecting rods 42 of rotary handle 32.

Lugs 44*a*, 44*b* engage in lug receptacles 45*a*, 45*b*, 45*c*, 45*d* to retain securing plate 43 in the respective positions, lug receptacles 45*a*, 45*b*, 45*c*, 45*d* being connected in pairs by guide grooves 47*a*, 47*b* for guidance of lugs 44*a*, 44*b*, as shown in detail in FIG. 6*b*.

FIG. 6*c* shows base 29 with retaining plate 43 fixed in its position on base 29 by means of the lugs 44*a*, 44*b* in the lug receptacles (of which lug receptacle 45*c* is indicated in FIG. 6*c* by way of example). Also shown are the guide grooves 47*a*, 47*b* connecting lug receptacles 45*a*, 45*b*, 45*c*, 45*d*. The spring elements 46*a*, 46*b*, 46*c*, 46*d* exert a force on plate 43 in the direction of base 29 in a symmetrical manner.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 slicing system
11 slicer
12 blade removal device
13 stop plate
14 carriage
15 blade guard ring
16 circular blade
17*a,b* through-holes
18*a,b* blade holders
19*a,b* fastening elements
20 arrow
21 side of the circular blade
22 drive
22' bulges
23 nut
23' recesses
24 release pin
25 retaining pin
26 drive pin
27 drive pin through-hole
28 (bayonet) interlock
29 base
30*a* contact side
30*b* side of the base opposite the contact side
31*a,b* axes of rotation of the fastening elements
32 rotary handle
33 hexagon
34 gripping portion
35 engagement portion
36*a,b* blade holder lever
37*a,b* retaining pin
38 stops
39 latch
40 springs
41 central opening
42 connecting rods
43 retaining plate
44*a,b* lugs
45*a,b,c,d* lug receptacles
46*a,b,c,d* spring elements
47*a,b* guide grooves
48 guide tube
49*a,b* receptacles
50*a,b* cutouts of the rotary handle
51*a,b* retaining plate openings
52 pin on the blade guard ring
55*a,b* protrusions of the nut
56*a,b* spring holders

The invention claimed is:

1. A blade removal device for removing a circular blade of a slicer for slicing off slices from a length of material to be sliced, the blade removal device comprising:

a base, which is configured to be positioned with a contact side on one side of the circular blade;

fasteners rotatably supported in the base, each being configured to be rotated about an axis of rotation of the respective one of the fasteners relative to the base from an attachment position for attaching the blade removal device to the circular blade into a holding position for holding the circular blade to the blade removal device; and a rotary handle rotatably supported on the base and configured to be rotated relative to the base from a closed position into an open position to release an interlock between the circular blade and the drive of the circular blade, the interlock being configured to be open when the rotary handle is in the open position and closed when the rotary handle is in the closed position, the fasteners in the attachment position being adapted to engage in cutouts of the rotary handle in the closed position, and the cutouts and the fasteners being out of engagement when the rotary handle is in the open position.

2. The blade removal device as recited in claim 1, wherein the fasteners each comprise:

a blade holder that is configured to be passed through associated through-holes of the circular blade in the attachment position and to hold the circular blade in the holding position, and a blade holder lever configured to rotate the blade holder, wherein the blade holder has a retaining pin oriented parallel to the base, wherein the blade holder lever is adapted to engage in one of the cutouts of the rotary handle in the closed position when the respective fastening element is in the attachment position, and wherein the blade holder lever is oriented perpendicular to the retaining pin and parallel to the base.

3. The blade removal device as recited in claim 2, wherein the base is configured with stops for the blade holder levers.

4. The blade removal device as recited in claim 1 wherein the fasteners comprise springs configured to press the circular blade against the base, the springs being disposed on the side of the base opposite the contact side.

5. The blade removal device as recited in claim 1, wherein the rotary handle is configured for rotating a hexagon, the hexagon being formed on a nut that is part of the interlock.

6. The blade removal device as recited in claim 1, wherein the rotary handle is configured to be transferred from the closed position into the open position by rotation through about 60°, the rotary handle being configured to extend through a central opening of the base.

7. The blade removal device as recited in claim 1, comprising:

a retaining plate having lugs disposed in the rotary handle, wherein the base has lug receptacles for receiving the lugs in the open position and/or the closed position of the rotary handle, wherein the rotary handle has at least one spring element configured to exert a spring force on the retaining plate in a direction of the base, the spring force being configured to push the lugs into the lug receptacles, and wherein the base has guide grooves for connecting the lug receptacles in pairs.

8. The blade removal device as recited in claim 7, wherein the retaining plate has a retaining pin for moving the retaining plate away from the base against the spring force of the at least one spring element, the retaining pin being centrally disposed in the rotary handle in a guide tube.

9. The blade removal device as recited in claim 1 wherein the blade removal device is configured with a latch for fixation to the blade guard ring and/or with receptacles for receiving pins of the blade guard ring.

10. A slicing system, the slicing system comprising:

a slicer configured to slice off slices from a length of material to be sliced, the slicer comprising a drive configured to hold and drive a circular blade, the drive and the circular blade being connected together by an interlock;

a blade removal device for removing the circular blade, the blade removal device comprising:

a base which is configured to be positioned with a contact side on one side of the circular blade;

fasteners rotatably supported in the base, each being configured to be rotated about an axis of rotation of the respective one of the fasteners relative to the base from an attachment position for attaching the blade removal device to the circular blade into a holding position for holding the blade removal device to the circular blade; and a rotary handle rotatably supported on the base and configured to be rotated relative to the base from a closed position into an open position to release the interlock between the circular blade and the drive of the circular blade, the interlock being configured to be open when the rotary handle is in the open position and closed when the rotary handle is in the closed position, wherein the fasteners in the attachment position are adapted to engage in cutouts of the rotary handle in the closed position, and wherein the cutouts of the rotary handle and fasteners are out of the engagement when the rotary handle is in the open position.

11. The slicing system as recited in claim 10, wherein the circular blade has through-holes configured for passage therethrough of associated blade holders of the fasteners in the attachment position of the fasteners and for locking the blade holders in the holding position of the fasteners.

12. The slicing system as recited in claim 10, wherein a nut is releasably attached to the circular blade about the axis of rotation thereof, the nut being part of the interlock and being configured with recesses to form the interlock with associated bulges of the drive of the circular blade, the nut having a hexagon formed thereon for rotating the nut, and the rotary handle in being configured for rotating the hexagon.

13. The slicing system as recited in claim 10, wherein the circular blade has an arrow that points to a pin on the blade guard ring when the circular blade is in an angular position where the through-holes are located at the top and bottom.

14. The slicing system as recited in claim 10, comprising wherein a retaining plate having lugs is disposed in the rotary handle, wherein the base has lug receptacles for receiving the lugs in the open position and/or the closed position of the rotary handle, wherein the rotary handle has at least one spring element configured to exert a spring force on the retaining plate in a direction of the base, the spring force being configured to push the lugs into the lug receptacles, wherein the base has guide grooves for connecting the lug receptacles in pairs, wherein the retaining plate has a retaining pin for moving the retaining plate away from the base against the spring force of the at least one spring element, the retaining pin being centrally disposed in the rotary handle in a guide tube, and wherein the drive of the circular blade has a release pin for releasing the retaining pin, the release pin resting against the retaining pin of the retaining plate and being disposed on the axis of rotation of the circular blade.

15. The slicing system as recited in claim 10, wherein the slicer is configured as a gravity feed slicer or as a vertical slicer.

16. The blade removal device as recited in claim 2, wherein the blade holder lever is disposed on the side of the base opposite the blade holder.

* * * * *